United States Patent
Guggenheim et al.

(10) Patent No.: US 10,526,449 B2
(45) Date of Patent: Jan. 7, 2020

(54) PROCESS TO MAKE LOW COLOR POLYETHERIMIDE BY HALO-DISPLACEMENT AND LOW COLOR POLYETHERIMIDE

(71) Applicant: SABIC GLOBAL TECHNOLOGIES B.V., Bergen op Zoom (NL)

(72) Inventors: Thomas Guggenheim, Mt. Vernon, IN (US); Jose Roman Galdamez, Madrid (ES); Javier Nieves Remacha, Madrid (ES); Juan J. Rodriguez Ordonez, Murcia (ES); Maria Patricia Forcen Jimenez, Murcia (ES); Hareesh Shamrao Deshpande, Bangalore (IN); Surya Prakasa Rao Daliparthi, Karnataka (IN); Sunil S. Dhumal, Maharashtra (IN); Sivakumar Periyasamy, Karnataka (IN); Srinivas Mahesh Kumar, Bangalore (IN); Siva Kumar Sreeramagiri, Bangalore (IN); Bernabe Quevedo Sanchez, Murcia (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/553,752

(22) PCT Filed: Feb. 26, 2016

(86) PCT No.: PCT/US2016/019784
§ 371 (c)(1),
(2) Date: Aug. 25, 2017

(87) PCT Pub. No.: WO2016/138388
PCT Pub. Date: Sep. 1, 2016

(65) Prior Publication Data
US 2018/0044474 A1    Feb. 15, 2018

(30) Foreign Application Priority Data
Feb. 27, 2015    (EP) ..................... 15382088

(51) Int. Cl.
*C08G 73/10*    (2006.01)

(52) U.S. Cl.
CPC ..... *C08G 73/1046* (2013.01); *C08G 73/1028* (2013.01); *C08G 73/1053* (2013.01)

(58) Field of Classification Search
CPC ................................................ C08G 73/1046
(Continued)

(56) References Cited

U.S. PATENT DOCUMENTS

| 4,276,232 A | 6/1981 | Rasberger |
| 4,330,666 A | 5/1982 | White et al. |

(Continued)

FOREIGN PATENT DOCUMENTS

| EP | 2644640 A1 | 10/2013 |
| EP | 2644641 A1 | 10/2013 |

(Continued)

OTHER PUBLICATIONS

U.S. Appl. No. 15/553,749 claims (Year: 2017).*
(Continued)

*Primary Examiner* — Duc Truong
(74) *Attorney, Agent, or Firm* — Cantor Colburn LLP

(57) ABSTRACT

A polyetherimide of improved color and processes for preparing the polyetherimide are disclosed.

13 Claims, 1 Drawing Sheet

(58) Field of Classification Search
USPC .......................................................... 528/335
See application file for complete search history.

(56) References Cited

U.S. PATENT DOCUMENTS

| | | | |
|---|---|---|---|
| 4,520,204 | A | 5/1985 | Evans |
| 4,988,544 | A | 1/1991 | Cella et al. |
| 5,229,482 | A | 7/1993 | Brunelle |
| 5,290,945 | A | 3/1994 | Roy et al. |
| 5,608,027 | A | 3/1997 | Crosby et al. |
| 6,235,866 | B1 | 5/2001 | Khouri et al. |
| 6,265,521 | B1 | 7/2001 | Fyvie et al. |
| 6,753,365 | B2 | 6/2004 | Brown et al. |
| 6,790,934 | B2 | 9/2004 | Johnson et al. |
| 6,919,418 | B2 | 7/2005 | Khouri et al. |
| 7,842,824 | B2 | 11/2010 | Mikami et al. |
| 8,080,671 | B2 | 12/2011 | Guggenheim et al. |
| 8,299,204 | B2 | 10/2012 | Germroth et al. |
| 8,354,491 | B2 | 1/2013 | Crawford et al. |
| 8,372,941 | B2 | 2/2013 | Bernabe et al. |
| 2003/0225194 | A1 | 12/2003 | Coffy et al. |
| 2007/0225479 | A1 | 9/2007 | Silvi et al. |
| 2008/0262196 | A1 | 10/2008 | Giammattei et al. |
| 2009/0163691 | A1 | 6/2009 | Bernabe et al. |
| 2009/0292128 | A1 | 11/2009 | Guggenheim et al. |
| 2011/0263760 | A1 | 10/2011 | Jakupca et al. |
| 2011/0263791 | A1 | 10/2011 | Chiong et al. |
| 2013/0260125 | A1 | 10/2013 | Ordonez et al. |
| 2013/0344313 | A1 | 12/2013 | Ordonez et al. |
| 2014/0094535 | A1 | 4/2014 | Guggenheim et al. |
| 2014/0099510 | A1 | 4/2014 | Chiong et al. |
| 2018/0037699 | A1 | 2/2018 | Guggenheim et al. |
| 2018/0127546 | A1 | 5/2018 | Guggenheim et al. |

FOREIGN PATENT DOCUMENTS

| | | |
|---|---|---|
| GB | 2280183 A | 1/1995 |
| WO | 2009143440 A1 | 11/2009 |

OTHER PUBLICATIONS

International Search Report for International Application No. PCT/US2016/019784, Inernational Filing Date Feb. 26, 2016, dated Aug. 11, 2016, 5 pages.

Written Opinion for International Application No. PCT/US2016/019784, Inernational Filing Date Feb. 26, 2016, dated Aug. 11, 2016, 8 pages.

\* cited by examiner

PROCESS TO MAKE LOW COLOR POLYETHERIMIDE BY HALO-DISPLACEMENT AND LOW COLOR POLYETHERIMIDE

CROSS REFERENCE TO RELATED APPLICATIONS

This application is a National Stage application of PCT/US16/19784, filed Feb. 26, 2016, which claims the benefit of European Patent Application 153820881.1, filed Feb. 27, 2015, both of which are incorporated by reference in their entirety herein.

BACKGROUND OF THE INVENTION

To meet the increased demand for polyetherimide, the "displacement polymerization" process has been developed. Synthesis of polyetherimides via the displacement polymerization process includes imidization as described, for example, in U.S. Pat. No. 6,235,866), to produce a bisphthalimide substituted with a leaving group; synthesis of a salt of a dihydroxy aromatic compound, as described, for example, in U.S. Pat. No. 4,520,204; and polymerization by reacting the substituted bisphthalimide and the salt ("displacement"), as described, for example, in U.S. Pat. No. 6,265,521, followed by downstream activities.

In particular, imidization generally proceeds by reaction of 2 moles of a phthalic anhydride substituted with a leaving group with 1 mole of diamine in a reaction solvent, such as ortho-dichlorobenzene (ODCB) to provide a bis(phthalimide) substituted with two leaving groups. In a specific embodiment, the substituted phthalic anhydride is 4-chlorophthalic anhydride, the diamine is meta-phenylene diamine, and the bisphthalimide is a bis(chlorophthalimide) (ClPAMI). When 3-chlorophthalic anhydride (3-ClPA) and 4,4-diaminodiphenyl sulfone (DDS) are used, the product is 4,4'-bis(phenyl-3-chlorophthalimide)sulfone (DDS ClPA-MI)). The bis(phthalimide) polymerizes with bisphenol A disodium salt (BPANa2) to provide the polyetherimide via chloro-displacement in the presence of a phase transfer catalyst, such as hexaethylguanidinium chloride.

There nonetheless remains an ongoing, unmet need for polyetherimides having improved color properties, and methods of making such polyetherimides.

SUMMARY OF THE INVENTION

A method for the manufacture of a polyetherimide is disclosed, the method comprising contacting a halophthalic anhydride having an APHA index of less than 120, preferably less than 100, and of the formula

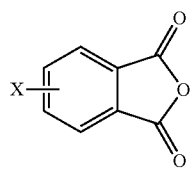

with an organic diamine having an APHA index of less than 170, preferably less than 100, and of the formula

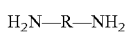

$H_2N-R-NH_2$ in a solvent to form a bis(halophthalimide) of the formula

and contacting the bis(halophthalimide) with an alkali metal salt of a dihydroxy aromatic compound having an APHA index of less than 100 in the presence or absence of an additional base selected from alkali metal carbonates, alkyl hydrides, alkali metal hydroxides, alkali metal phosphates, alkali metal bicarbonates, alkali metal acetates, and combinations thereof, wherein the metal salt of the dihydroxy aromatic compound is of the formula

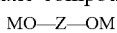

$MO-Z-OM$ to form the polyetherimide comprising the structural units of the formula

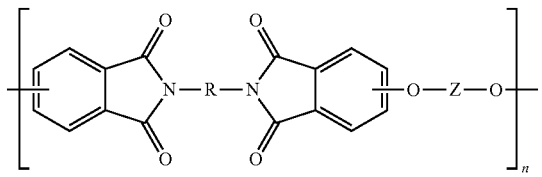

wherein in the foregoing formulae, X is selected from fluoro, chloro, bromo, iodo, and combinations thereof; each R is independently the same or different, and is a substituted or unsubstituted straight or branched chain $C_{2-20}$ alkylene group, a substituted or unsubstituted $C_{3-8}$ cycloalkylene group, or a combination thereof; and n is an integer greater than 1, wherein the polyetherimide has a yellowness index of less than 93.

A method for the manufacture of a polyetherimide is disclosed, the method comprising contacting a halophthalic anhydride having an APHA index of less than 120, preferably less than 100, and of the formula

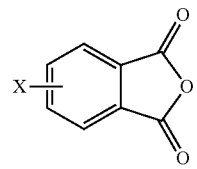

with an organic diamine having an APHA index of less than 170, preferably less than 100, and of the formula

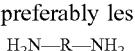

$H_2N-R-NH_2$ to form a crude bis(halophthalimide) of the formula

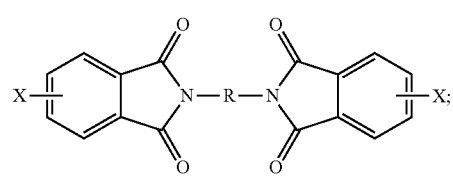

and optionally contacting the crude bis(halophthalimide) with, solvent (including but not limited to petroleum ethers, aromatic hydrocarbons, halogenated aromatics, halogenated aliphatics, aliphatic ethers, alcohols, acetonitrile, aliphatic ketones, aliphatic esters, halogenated aromatics, halogenated hydrocarbons), in one embodiment, methanol, hexane or a combination thereof, to provide a slurry; filtering the slurry to provide a filtered bis(halophthalimide); and washing the filtered bis(halophthalimide) with solvent (including but not limited to petroleum ethers, aromatic hydrocarbons, halogenated aromatics, halogenated aliphatics, aliphatic ethers, alcohols, acetonitrile, aliphatic ketones, aliphatic esters, halogenated aromatics, halogenated hydrocarbons), in one embodiment, methanol, hexane, orthodichlorobenzene or a combination comprising at least one of the foregoing at a temperature of ambient to 150° C., in an embodiment at least 50° C., to provide bis(halophthalimide) useful to ultimately produce a polyetherimide having a Yellowness Index of less than 93, less than 90, less than 80, or less than 70, and then contacting the bis(halophthalimide) with an alkali metal salt of a dihydroxy aromatic compound having an APHA index of less than 50, in the presence or absence of an optional base, wherein the metal salt of the dihydroxy aromatic compound is of the formula

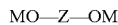

to form the polyetherimide comprising the structural units of the formula

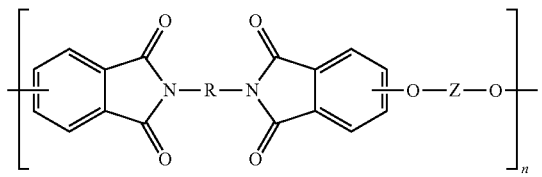

wherein in the foregoing formulae: X is selected from fluoro, chloro, bromo, iodo, and combinations thereof; each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof; M is an alkali metal; Z is an aromatic $C_{6-24}$ monocyclic or polycyclic moiety optionally substituted with 1 to 6 $C_{1-8}$ alkyl groups, 1 to 8 halogen atoms, and combinations thereof; and n is an integer greater than 1, wherein the polyetherimide has a yellowness index of less than 93, 90, 80, or 70.

Also disclosed is a low color polyetherimide prepared via the halo-displacement reaction of an alkali metal salt of a dihydroxy aromatic compound, with a bis(halophthalimide), wherein the polyetherimide is of the formula

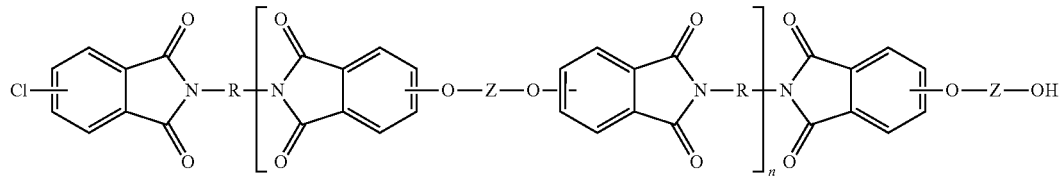

wherein R and Z are a linear or cyclic $C_{2-20}$ alkyl group or a substituted or unsubstituted $C_6$-$C_{30}$ aryl group, n has a value of 1 to 100, wherein the polyetherimide has a Yellowness Index less than less than 93, less than 80, or less than 70; and wherein the polyetherimide has a chlorine content that is greater than 0 ppm.

DETAILED DESCRIPTION OF THE INVENTION

The halo-displacement route is an in-situ reaction process where the impurities associated with raw materials and undesired impurities formed during imidization, BPANa$_2$ manufacture, and mPD storage, stay throughout all the steps until resin isolation.

Figure 1:
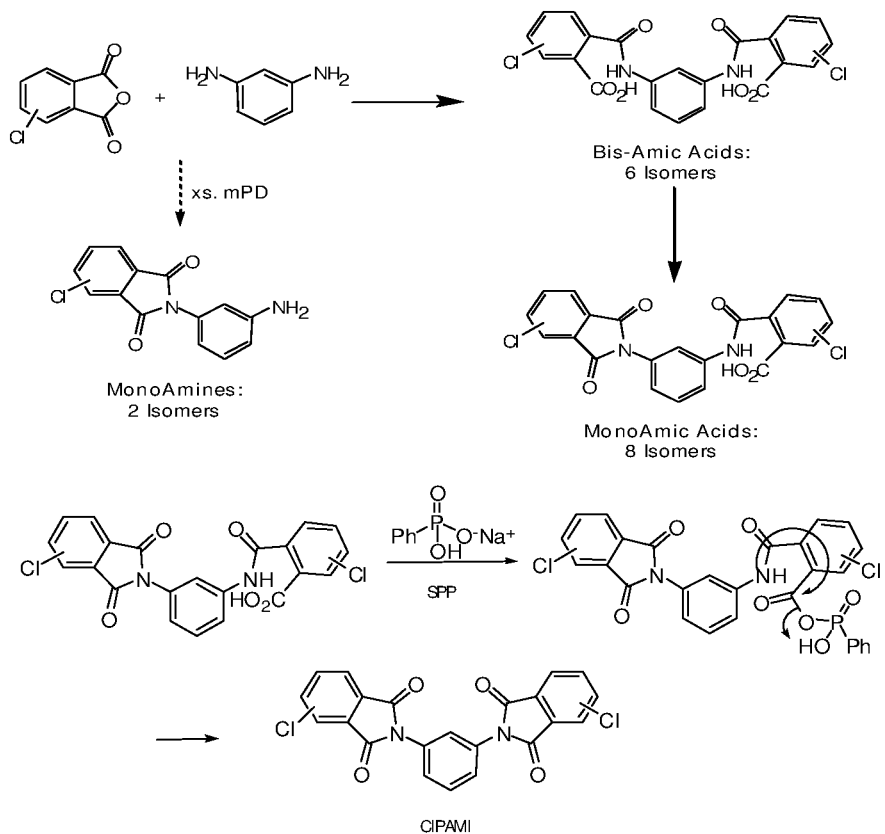
FIG. 1 is a reaction scheme showing imidization.

As shown in FIG. 1, imidization is a process where a diamine, such as mPD, reacts with chlorophthalic anhydride to form ClPAMI as shown below. Sodium phenylene phosphinate (SPP) has been used as an imidization catalyst as described in U.S. Pat. Nos. 6,919,418 and 6,235,866, and HEGCl is used as described in patent application US 2014/0099510. This imidization catalyst facilitates the reaction between monoamine and chlorophthalic anhydride to form monoamic acid and also facilitates the ring closure reaction to convert monoamic acid to ClPAMI.

One aspect of this invention is the improvement of imide quality after imidization by cleaning of ClPAMI with selected organic solvents, resulting in low color polymer. In another aspect, during the ClPAMI reaction, the relative proportions of reactants were controlled so that the stoichiometry was maintained anhydride-rich. The results of these experiments are described in the results section.

In another aspect, the polymerization reaction is carried out in the same reactor used to make the ClPAMI (i.e., reaction occurs in-situ) by reacting chlorophthalic anhydride meta-imide (ClPAMI) with disodium salt of BPA in the presence of a phase transfer catalyst (PTC). The PTC used was hexaethylguanidium chloride (HEGCl). Three different protocols can be followed in the polymerization: Method 1; the Double Slurry method; and the Cold Double Slurry method.

Double Slurry method: the ClPAMI/solvent mixture made with or without an imidization catalyst is dried (imide stoichiometry: about 0.15 to 0.3 mole % ClPA rich, r-MA [residual mono-amine] less than 0.4 to 0.6 mole %) and then dry BPANa$_2$/solvent slurry (either hot, 100° C. to 160° C., or cold at 25° C.) is then metered into the ClPAMI/solvent mixture. The dryness of the double slurry (ClPAMI+BPA salt) is reconfirmed before the catalyst charge. Once the double slurry is dry (less than 300 ppm water in the distillate, also referred to as overheads), HEGCl (dry) is charged into the reactor to initiate polymerization.

Method 1: A wet HEGCl/solvent solution (for example, less than 5 ppm to 400 ppm moisture) is charged into the on-stoichiometry ClPAMI bisimide before the BPANa$_2$ is added and dried again (at 170 to 185° C., imide stoichiometry: 0.1 to 0.2 mole % ClPA rich, r-MA less than 0.04 mole % to 0.2 mole %). Then dried BPA salt (cold, 25° C.) is then charged into the imide reactor to start the polymerization reaction at 180° C.

Cold Double Slurry method: The HEGCl is added to the on-stoichiometry ClPAMI (stoichiometry: 0.1 to 0.2 mole % ClPA rich, r-MA less than 0.04 mole %) and the reaction mass temperature was reduced from 175 to 130° C.-135° C. after drying. Dried BPANa$_2$/solvent slurry (either at 90 to 100° C. or about 25° C.) was then added. The reaction mass was kept at 130 to 135° C. for an hour and then heated to 175 to 185° C. to start polymerization.

Figure 2:
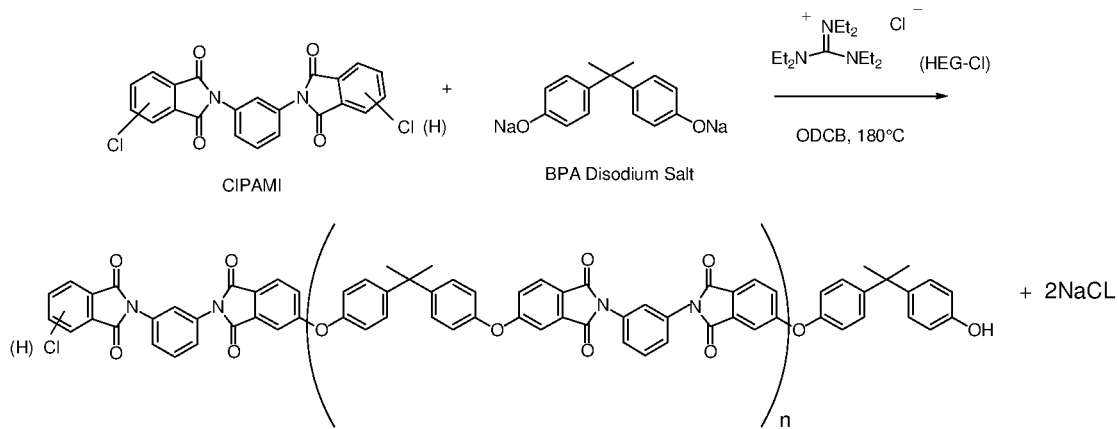
FIG. 2 is a reaction scheme showing polymerization.

Intermediate samples can be withdrawn during the course of polymerization for analysis by Gel Permeation chromatography (GPC) to track the molecular weight build. NaCl is the byproduct of the reaction and it is removed from the polymer in downstream operations. The polymerization reactions were typically carried out at 20 to 25% solids concentration. The overall reaction scheme is shown in FIG. 2.

The polyetherimides are of formula (1)

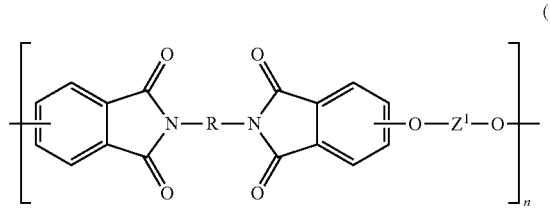

(1)

wherein n is greater than 1, for example 2 to 1000, or 5 to 500, or 10 to 100. In formula (1) each R is independently the same or different, and is a substituted or unsubstituted divalent organic group, such as a substituted or unsubstituted C$_{6-20}$ aromatic hydrocarbon group, a substituted or unsubstituted straight or branched chain C$_{2-20}$ alkylene group, a substituted or unsubstituted C$_{3-8}$ cycloalkylene group, or a combination thereof. In an embodiment, R is a divalent group (3)

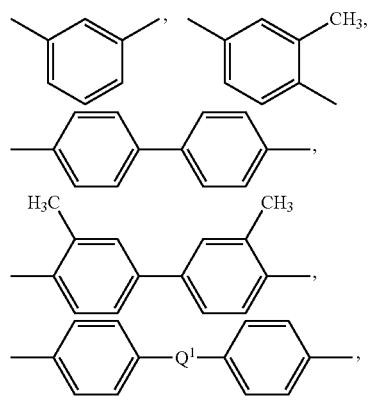

(3)

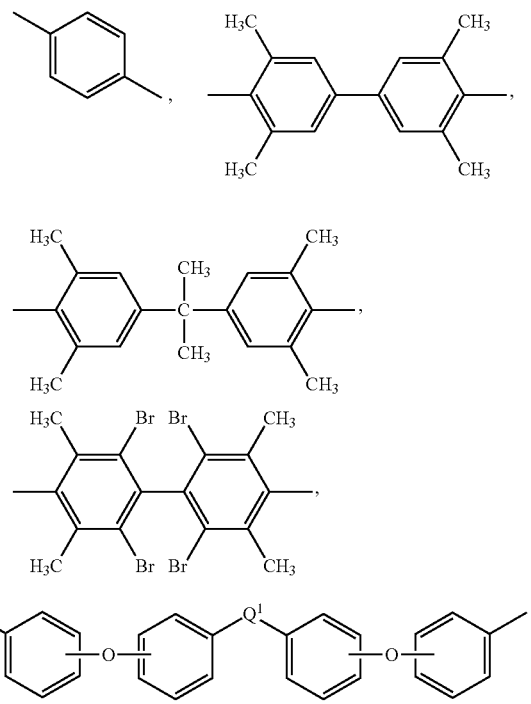

or a combination thereof, wherein Q$^1$ is —O—, —S—, —C(O)—, —SO$_2$—, —SO—, —C$_y$H$_{2y}$— wherein y is an integer from 1 to 5 or a halogenated derivative thereof, including perfluoroalkylene groups, or —(C$_6$H$_{10}$)$_z$— wherein z is an integer from 1 to 4. In some embodiments, R is the diether aromatic moiety having four phenylene groups wherein Q is a direct bond, —O—, —S—, —C(O)—, —SO$_2$—, —SO—, —C$_y$H$_{2y}$— and a halogenated derivative thereof wherein y is an integer from 1 to 5, or —(C$_6$H$_{10}$)$_z$— wherein z is an integer from 1 to 4. In some embodiments, R is m-phenylene, p-phenylene, or a diarylsulfone. The diarylsulfone can be, for example, 4,4'-diphenylsulfone. Embodiments where R is a divalent arylene ether can also be specifically mentioned, for example, an arylene ether of the formula

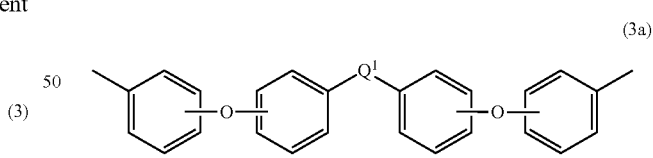

(3a)

wherein Q$^1$ is selected from a direct bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4. In an embodiment, Q$^1$ in formula (3a) is —O—.

The group Z in formula (1) is a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z$^1$ include groups of formula (4)

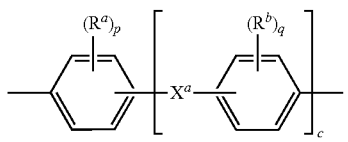
(4)

wherein $R^a$ and $R^b$ are each independently a halogen atom or a monovalent hydrocarbon group; p and q are each independently integers of 0 to 4; c is zero to 4; and $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

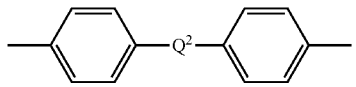
(4a)

wherein $Q^2$ is —O—, —S—, —C(O)—, —SO$_2$—, —SO—, —C$_y$H$_{2y}$— wherein y is an integer from 1 to 5 and halogenated derivatives thereof, including perfluoroalkylene groups. In a specific embodiment, Q is 2,2-isopropylidene.

In another specific embodiment, the polyetherimide comprises more than 1, specifically 10 to 150, more specifically, 10 to 50 structural units, of formula (1) wherein R is a divalent group of formulas (3) wherein $Q^1$ is —C$_y$H$_{2y}$— wherein y is an integer from 1 to 5 or a halogenated derivative thereof, and Z is a group of formula (4a). In a specific embodiment, R is m-phenylene, p-arylene diphenylsulfone, or a combination thereof, and $Z^1$ is 2,2-(4-phenylene)isopropylidene. An example of a polyetherimide sulfone comprises structural units of formula (1) wherein at least 50 mole percent of the R groups are of formula (2) wherein Q is —SO$_2$— and the remaining R groups are independently p-phenylene or m-phenylene or a combination comprising at least one of the foregoing; and $Z^1$ is 2,2-(4-phenylene)isopropylidene.

The polyetherimides are prepared by the so-called "halo-displacement" or "halo-displacement" method. In this method, a halophthalic anhydride of formula (7)

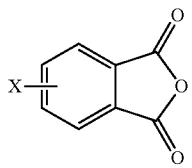
(7)

wherein X is a halogen, is condensed (imidized) with an organic diamine of the formula (8)

$$H_2N—R—NH_2 \quad (8)$$

wherein R is as described in formula (1), to form a bis(halophthalimide) of formula (9).

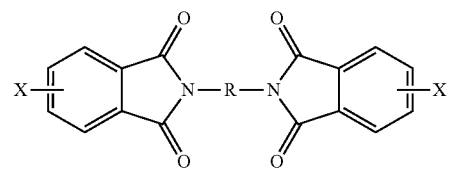
(9)

In an embodiment, X is a halogen, specifically fluoro, chloro, bromo, or iodo, more specifically chloro. A combination of different halogens can be used.

The organic diamine can be 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(4-aminophenyl) propane, 2,4-bis(p-amino-t-butyl) toluene, bis (p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing Condensation of halophthalic anhydride (7) and diamine (8) (imidization) can be conducted in the absence or presence of a catalyst. The reaction is generally conducted in the presence of a relatively non-polar solvent, preferably with a boiling point above 100° C., specifically above 150° C., for example, o-dichlorobenzene, dichlorotoluene, 1,2,4-trichlorobenzene, a monoalkoxybenzene such as anisole, veratrole, diphenylether, or phenetole. In an embodiment, the non-polar solvent is ortho-dichlorobenzene or anisole.

The bis(halophthalimide)s (9) are generally prepared at a temperature of at least 110° C., in an embodiment from 130° C. to 240° C. At temperatures below 110° C., reaction rates may be too slow for economical operation. Atmospheric or super-atmospheric pressures can be used, for example, up to 5 atmospheres, to facilitate the use of high temperatures without causing solvent to be lost by evaporation.

The solvent, diamine (8), and halophthalic anhydride (7) can be combined in amounts such that the total solids content during the reaction to form bis(halophthalimide) (9) does not exceed 25 wt. %. "Total solids content" expresses the proportion of the reactants as a percentage of the total weight including liquids present in the reaction at any given time.

In general practice, a molar ratio of halophthalic anhydride (7) to diamine (8) of 1.98:1 to 2.04:1, or about 2:1 is used. A proper stoichiometric balance between halophthalic anhydride (7) and diamine (8) is maintained to prevent undesirable by-products or excess starting materials that can limit the molecular weight of the polymer, and/or result in polymers with amine end groups. Accordingly, in an embodiment, imidization proceeds adding diamine (8) to a mixture of halophthalic anhydride (7) and solvent to form a reaction mixture having a targeted initial molar ratio of halophthalic anhydride to diamine; heating the reaction mixture to a temperature of at least 100° C. (optionally in the presence of an imidization catalyst); analyzing the molar ratio of the heated reaction mixture to determine the actual initial molar ratio of halophthalic anhydride (7) to diamine (8); and, if necessary, adding halophthalic anhydride (7) or diamine (8) to the analyzed reaction mixture to adjust the molar ratio of halophthalic anhydride (7) to diamine (8) to 2.01 to 2.3, preferably 2.0 to 2.03.

After imidization, the bis(halophthalimide) (8) is polymerized by reaction with an alkali metal salt of a dihydroxy aromatic compound to provide the polyetherimide (1). In an embodiment, the halogen group X of bis(halophthalimide) (9)

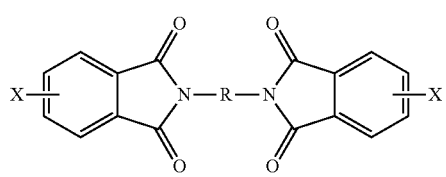

(9)

is displaced by reaction with an alkali metal salt of a dihydroxy aromatic compound of formula (10)

$$MO—Z—OM \tag{10}$$

wherein $M^1$ is an alkali metal and $Z^1$ is as described in formula (1a), to provide the polyetherimide of formula (1) as described above.

Alkali metal M can each independently be any alkali metal, for example, lithium, sodium, potassium, and cesium, or a combination thereof. Specific metals are potassium or sodium. In some embodiments, $M^1$ is sodium. The alkali metal salt (10) can be obtained by reaction of the metal with an aromatic dihydroxy compound of formula (4), specifically an aromatic $C_{6-24}$ monocyclic or polycyclic dihydroxy compound optionally substituted with 1 to 6 $C_{1-8}$ alkyl groups, 1 to 8 halogen atoms, or a combination thereof, for example, a bisphenol compound of formula (11):

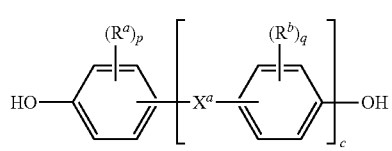

(11)

wherein $R^a$, $R^b$, and $X^a$ are as described in formula (3). In a specific embodiment, the dihydroxy compound corresponding to formulas (4a) can be used. The compound 2,2-bis(4-hydroxyphenyl) propane ("bisphenol A" or "BPA") can be used.

The polymerization can be conducted in the presence of an alkali metal salt of a monohydroxy aromatic compound of formula (12)

$$M^2O—Z^2 \tag{12}$$

wherein $M^2$ is an alkali metal and $Z^2$ is a monohydroxy aromatic compound. It has been found by the inventors hereof that when the amount of the monohydroxy aromatic salt (12) is greater or equal to 5 mole percent, based on the total moles of the alkali metal salts (10) and (12), a polyetherimide having a weight average molecular weight from more than 600 to less than 43,000 Daltons can be obtained as further described below.

Further, as described in more detail below, the polyetherimides can have low residual content (starting material or intermediate products, present as impurity in final product) and good physical properties. The amount of monohydroxy aromatic salt (12) can also be 6 to 15 mole percent, or 6 to 10 mole percent, based on the total moles of the alkali metal salts (10) and (12). For example, the amount of monohydroxy aromatic salt (12) can be 5 to 15, or 5 to 12, or 5 to 9, or 5 to 7 mole percent.

Alkali metal $M^2$ can be any alkali metal, for example, lithium, sodium, potassium, and cerium, and is generally the same as the alkali metal M. Thus alkali metal salt (12) is selected from lithium salts, sodium salts, potassium salts, cesium salts, and a combination thereof. Specific metals are potassium or sodium. In some embodiments, $M^2$ is sodium. The alkali metal salt (12) can be obtained by reaction of the metal $M^2$ with aromatic $C_{6-24}$ monocyclic or polycyclic monohydroxy compound optionally substituted with 1 to 6 $C_{1-8}$ alkyl groups, 1 to 8 halogen atoms, or a combination thereof, for example, a monohydroxy aromatic compound formula (13)

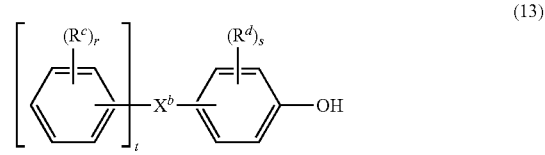

(13)

wherein $R^c$ and $R^d$ are each independently a halogen atom or a monovalent hydrocarbon group; r and s are each independently integers of 0 to 4; t is 0 or 1; when t is zero, $X^b$ is hydrogen or a $C_{1-18}$ alkyl group; and when t is 1, $X^b$ is a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. In some embodiments, t is zero and $X^b$ is hydrogen or a $C_{4-12}$ alkyl group or t is one and $X^b$ is a single bond or a $C_{1-9}$ alkylene group. In some embodiments $Z^2$ is a group of formulae (13a)

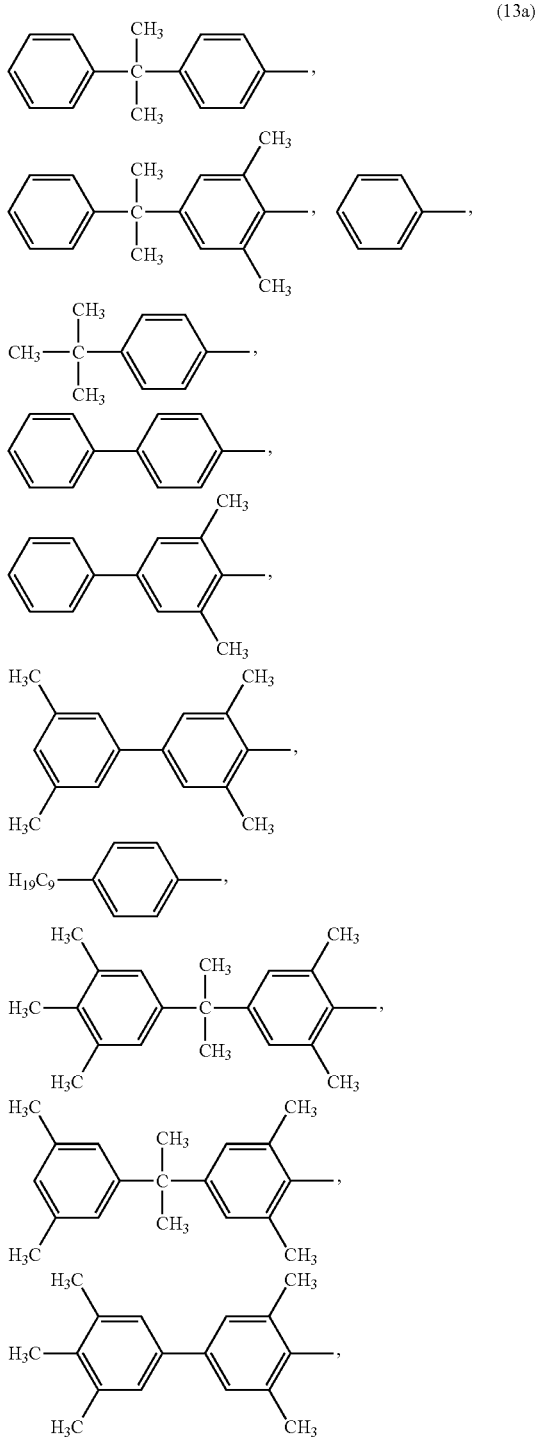

or a combination comprising at least one of the foregoing.

Polymerization by reaction of bis(halophthalimide) (9) with a combination of alkali metal salts (10) and (12) can be in the presence of phase transfer catalyst that is substantially stable under the reaction conditions used, including temperature. Exemplary phase transfer catalysts for polymerization include hexaalkylguanidinium and α,ω-bis(pentaalkylguanidinium)alkane salts. Both types of salts can be referred to herein as "guanidinium salts."

Polymerization is generally conducted in the presence of a relatively non-polar solvent, preferably with a boiling point above 100° C., in an embodiment above 150° C., for example, o-dichlorobenzene, dichlorotoluene, 1,2,4-trichlorobenzene, diphenyl sulfone, a monoalkoxybenzene such as anisole, veratrole, diphenylether, or phenetole. In an embodiment, the non-polar solvent is ortho-dichlorobenzene or anisole.

Polymerization can be conducted at least 110° C., in an embodiment 150° C. to 250° C., and in another embodiment 150° C. to 225° C. At temperatures below 110° C., reaction rates may be too slow for economical operation. Atmospheric or super-atmospheric pressures can be used, for example, up to 5 atmospheres, to facilitate the use of high temperatures without causing solvent to be lost by evaporation.

In an embodiment, the combination of alkali metal salts (10) and (12) dissolved in water is added to the organic solvent and the water is removed from the mixture, for example, as its azeotrope. The bis(halophthalimide) (9) is prepared from a halo-substituted phthalic anhydride and a diamine in a solvent, and the water of imidization is then removed from the reaction mixture, for example, as its azeotrope, followed by addition of a catalyst in a pre-dried solution in organic solvent. Water removal from the system can be accomplished in either batch, semi-continuous or continuous processes using means known in the art such as a distillation column in conjunction with one or more reactors. In an embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include passing the condensed distillate through a drying bed for chemical or physical adsorption of water.

Polymer is formed from the reaction of the bis(halophthalimide) (9) with alkali metal salt (10) in a solvent in the presence of a phase transfer catalyst. The molar ratio of the bis(halophthalimide) (9) to the alkali metal salt (10) can be 1.0:0.9 to 0.9:1.0.

In an embodiment, the polyetherimides have a weight average molecular weight (Mw) within the range of 20,000 Daltons to 100,000 Daltons. In other embodiments, the polyetherimide has a weight average molecular weight of about 40,000 to 50,000 Daltons.

In an embodiment, the polyetherimide has a Yellowness Index of less than 93, less than 92, less than 91, less than 90, less than 89, less than 88, less than 87, less than 86, less than 85, less than, 80, less than 75, less than 70, less than 65, or less than 60. In any of the foregoing embodiments, the Yellowness Index can be greater than 0.1, or greater than 1.

In an embodiment, the BPANa$_2$ salt has an APHA index of less than 100, less than 90, less than 80, less than 70, less than 60, less than 50, less than 40, less than 30, less than 25, less than 20, less than 15, less than 10, or less than 5. In any of the foregoing embodiments, the APHA index can be greater than 0.1, or greater than 1.

In an embodiment, the nitrogen gas contains less than 100 ppm oxygen, less than 80 ppm oxygen, less than 60 ppm oxygen, less than 40 ppm oxygen, less than 20 ppm oxygen, less than 5 ppm oxygen, less than 3 ppm oxygen, or less than 2 ppm oxygen. In any of the foregoing embodiments, the oxygen index can have a minimum of 0.1 ppm, or greater than 1 ppm.

In an embodiment, the diamine, such as m-phenylene diamine, has an APHA index of less than 170, less than 160, less than 150, less than 140, less than 130, less than 120, less than 110, less than 100, less than 90, less than 80, less than 70, less than 60, less than 50, less than 40, less than 30, less than 20, less than 10, or less than 5. In any of the foregoing embodiments, the APHA index can be greater than 0.1, or greater than 1.

In an embodiment, the chlorophthalic anhydride has an APHA index of less than 120, less than 110, less than 100, less than 90, less than 80, less than 70, less than 60, less than 55, less than 50, less than 45, less than, 40, less than 35, less than 30, less than 25, or less than 20. In any of the foregoing embodiments, the minimum APHA index can be 0.1 or 1. This lower color polymer allows use of lower amounts of colorant to meet color specifications. Use of excess colorants can result in loss of other polymer physical properties. A low base polymer color is therefore desirable.

The various embodiments are further illustrated by the following non-limiting examples.

EXAMPLES

The materials in Table 1 were used or made in the following Examples and Comparative Examples.

TABLE 1

| Acronym | Description | Source |
|---|---|---|
| PA | Phthalic anhydride | |
| 3-ClPA | 3-Chlorophthalic anhydride | SABIC |
| 4-ClPA | 4-Chlorophthalic anhydride | SABIC |
| ClPA | Mixture of 3-chlorophthalic anhydride and 4-chlorophthalic anhydride | SABIC |
| ClPAMI | 1,3-bis[N-(4-chlorophthalimido)]benzene | Examples |
| Mono-ClPAMI (MA) | Mixture of 1-amino-3-N-(4-chlorophthalimido)benzene, and 1-amino-3-N-(3-chlorophthalimido)benzene | Examples |
| 4-monoamine | see FIG. 1 | Examples |
| 3-monoamine | isomer of the 4-monoamine in FIG. 1 | Examples |
| Phthalic anhydride monoamine | Monoimide wherein one of the amino groups of metaphenylene diamine has been imidized with phthalic anhydride | Examples |
| mPD | meta-Phenylene diamine | DuPont |
| BPA | 2,2-Bis(4-hydroxyphenyl)propane, (Bisphenol A) | Chiba/CTG |
| BPANa$_2$ | Bisphenol A, disodium salt | SABIC |
| BPADA | Bisphenol A dianhydride | SABIC |
| PCP | para-Cumyl phenol | SABIC |
| PEI | Polyetherimide | Examples |
| o-DCB | ortho-Dichlorobenzene | Fischer |
| HEGCl | Hexaethylguanidinium chloride | Atul Ltd. |
| SPP | Sodium phenylphosphinate | Akzo |
| NaOH | Sodium hydroxide | Sigma Aldrich |
| KP | Tripotassium phosphate | Sigma Aldrich |

Property Testing

APHA is a single number Yellowness Index used for measuring yellow coloration in nearly white liquid samples. APHA index values were determined in accordance with ASTM D1209. Samples of solutions as reported below were analyzed with a Gretag Macbeth Color Eye 7000A instrument. The instrument readings thus obtained are reported as solution APHA values. In some cases, the solution APHA value was inserted into a formula to yield a calculated estimate of a dry APHA value.

The APHA of mPD was determined by dissolving 10 grams of mPD in methanol to make a 100 mL solution, and measuring the APHA of the solution. The instrument reading was solution APHA. All APHA values reported for mPD are solution APHA values.

To measure APHA of BPANa$_2$ salt, a 2 gram sample of BPANa$_2$ aqueous solution or oDCB slurry was taken and diluted up to 100 mL using acetonitrile-water mixture (60:40 mix by volume). After analyzing the sample for APHA using a Gretag Macbeth Color Eye 7000A instrument, the instrument reading (solution APHA) was converted to APHA on the dry basis of BPANa$_2$ salt weight as follows:

$$APHA = (\text{Solution APHA} \times 100)/(\text{Sample weight} \times \text{solid wt. \%}) \quad \text{Eq. (1)}$$

All APHA values reported for BPANa$_2$ salt were calculated based on Equation (1).

Generally, the YI (Yellowness Index) is a number calculated from spectrophotometric data that describes the color of a test sample as being clear or white (low YI) versus being more yellow (high YI). Sample handling and preparation can affect the test results. The Yellowness Index of polyetherimide polymer was determined by measuring the YI of the resulting solution on a Gretag Macbeth Color Eye 7000A instrument. The instrument reading was referred to as solution YI. The YI values reported are predicted plaque YI calculated based on the following correlation:

$$\text{Predicted Plaque YI} = (\text{Solution YI} + 18.2)/0.5986 \quad \text{Eq. (2)}$$

General Procedures

BPANa$_2$ Salt Synthesis at Laboratory Scale

A. BPANa$_2$ Salt Synthesis in Water

Before starting BPANa$_2$ salt synthesis, N$_2$ was bubbled overnight through de-mineralized water (about 1 liter contained in a round bottom flask) to remove dissolved oxygen. Once the de-oxygenated water was ready, a 4-neck 1-liter round bottom flask was transferred to a glove box (under N$_2$ environment) along with all the raw materials. Then 41.9 grams of BPA (183.54 mmol), 14.7 grams of NaOH (367.50 mmol) and 449 grams of de-oxygenated water were charged into the flask at room temperature, along with a magnetic stirrer, and a condenser was fixed on the top of the flask. The flask was taken to a hood, immersed in an oil bath, and mild magnetic stirring was applied. The whole system was then kept under nitrogen environment for about 30 minutes at room temperature to remove oxygen. Then the oil bath temperature was raised to 70° C. to 80° C. and N$_2$ sweep was provided to maintain inert atmosphere during the course of the reaction. The approximate solid weight % of the BPANa$_2$ salt was around 21%. The system was kept under total reflux conditions to prevent water losses during the reaction. Typically within 1 hour the reaction mass became clear indicating completion of BPANa$_2$ salt formation.

To track the BPANa$_2$ salt quality over time, samples of BPANa$_2$ salt solution were checked at regular time intervals for APHA value and the stoichiometry of the reaction. Based on stoichiometry, corrections were made (either BPA or NaOH) to maintain the desired stoichiometry for BPANa$_2$ salt. The APHA obtained was converted to APHA on the dry basis based on equation (1). This calculated APHA value is also referred to as APHA of BPANa$_2$ (aqueous stage).

B. Solvent Swapping into oDCB

Before starting the solvent swapping, oDCB (0.5 to 1 liter) was agitated while applying 150° C. heating oil temperature under N$_2$ sweep for about 0.5 to 1 hour to remove any dissolved oxygen. Aqueous BPANa$_2$ salt solution from step A was added dropwise to oDCB. The aqueous BPANa$_2$ salt solution feed temperature was maintained at around 70° C. to avoid the precipitation of BPANa$_2$ salt, which may create operational difficulties while performing solvent swapping. The water along with the oDCB distillate was collected in the Dean-Stark. The total time required for swapping 21 wt. % aqueous BPANa$_2$ salt (100 g batch size) solution was around 5 to 6 hours. After the completion of the swapping, the BPANa$_2$ salt solution temperature was increased slowly to 190° C. for the removal of water-oDCB mixture, and maintained until the collected water-oDCB mixture reached the moisture specification of 200 to 400 ppm in the distillate.

C. Homogenization

The oDCB based BPANa$_2$ salt solution was allowed to cool down to room temperature and then transferred to a 1-liter glass bottle under N$_2$ environment. A laboratory scale IKA homogenizer (Model: T25 Ultra Turrax) was operated intermittently to homogenize the oDCB based BPANa$_2$ salt solution at a speed of 8,000 to 9,000 rpm for about 1 hour (instead of using homogenizer continuously, to avoid local heating, it needed to be switched off after every 15 minutes of use for about 5 to 10 minutes). This homogenization operation was carried out under N$_2$ environment at room temperature.

D. Drying

The homogenized BPANa$_2$ salt was then transferred into either a 1 or 2-liter 5-neck round bottom (RB) flask. For those runs in which tripotassium phosphate (KP) had not been added to BPANa$_2$ salt during the solvent swapping stage, KP in the form of an oDCB based slurry with particle size distribution (PSD) of less than 70 micron was then added in slight excess (1.25 wt. % based on the final polymer weight) at room temperature to the homogenized BPANa$_2$. The 1.25 wt. % excess KP amount was decided based on the observed —OH end group concentration in the final polymer, which should be less than 80 ppm. Particle size of KP was critical to achieve the OH end group specification in the final polymer. N$_2$ was then bubbled through the solution for about 1 to 2 hours at room temperature to remove any oxygen that may have been introduced with the KP slurry or the homogenized BPANa$_2$ salt slurry.

Then the final BPANa$_2$ salt drying was started by adjusting the oil bath temperature to 190° C. to 195° C. The reaction temperature was maintained until the oDCB collected overhead from the system met the water content specification (less than 20 ppm). Then heating was stopped and the BPANa$_2$ salt solution was cooled down to room temperature. Later it was stored under N$_2$ environment inside a glove box at room temperature. Finally, the solid percentage of the BPANa$_2$ salt was measured using HCl titration method. Based on this solid wt. % and measured solution APHA of BPANa$_2$, APHA on dry BPANa$_2$ salt basis was calculated. The calculated APHA is also referred to as APHA of BPANa$_2$ (after drying).

BPANa$_2$ Salt Synthesis at Pilot Scale

A. Aqueous BPANa$_2$ Salt Reaction

BPA addition: The required quantity of water to maintain about 25 wt. % of BPANa$_2$ salt was added into an aqueous salt reactor. It was then heated to about 70° C. to 80° C. under N$_2$ bubbling for 2 hours to deoxygenate the water. A stoichiometric quantity of BPA was added into the pool of hot water at about 80° C. via a hopper in the aqueous reactor.

Caustic lye preparation: The required amount of deoxygenated water to make about 40 wt. % NaOH solution was drained from the aqueous BPANa$_2$ salt reactor prior to BPA addition. The pre-weighed NaOH pellets were added slowly into deoxygenated water to make caustic lye solution. An ice bath or chilling water bath, maintained at 5° C. to 6° C., was used to control excessive heat of dissolution. The caustic lye solution thus prepared was charged into a caustic lye tank that was maintained at room temperature. N$_2$ was bubbled through the caustic lye tank until the addition of caustic lye into the aqueous reactor started.

Aqueous reaction: After completion of the BPA addition into the aqueous BPANa$_2$ salt reactor, it was purged with N$_2$ for at least 1 hour to remove residual oxygen from the reaction mixture. After 1 hour of N$_2$ bubbling, the reactor temperature was decreased to about 70° C. to 74° C. Subsequently, the caustic lye tank was pressurized (about 1 to 1.5 barg) and the caustic lye solution was charged to the BPANa$_2$ reactor over a period of 20 to 30 minutes via a sparger line (perforated dip tube used for caustic addition and N$_2$ bubbling during reaction). As the caustic lye was added, the reactor temperature was allowed to increase by 3° C. to 5° C. due to reaction exotherm. During the initial set of experiments, NaOH flakes were charged through a hopper as solid instead of solution. Sufficient care was taken to maintain temperature of the reactor contents below 82° C. by monitoring the rate of NaOH addition. Changing to the addition of lye via sparger helped to minimize the color formation in aqueous BPANa$_2$ salt and also reduced the water loss due to evaporation.

After the completion of NaOH addition, the temperature of the reaction was increased to 80° C. to 85° C. After 1 hour from the completion of caustic lye addition, a sample was removed from the reactor to measure the stoichiometry of the reactant residuals, as described in U.S. Pat. No. 5,851,837. If the reaction was not on stoichiometry specification ("on stoic."), corresponding quantities of reactant (BPA or NaOH), as indicated by the BPA salt stoichiometry calculator, was added into the reactor. One hour after the stoic correction, a sample was drawn again and checked for the stoic. The sample was analyzed for APHA to measure the BPANa$_2$ salt color at the aqueous stage. This procedure of sampling, analysis, and stoic correction was repeated until the reaction was on stoic. The on stoic reactor mixture marked the completion of the reaction. The resulting mixture was ready for solvent swapping.

B. Primary Drier (Solvent Swapping) and Homogenization

Once the aqueous BPANa$_2$ salt reaction was considered complete, the aqueous BPANa$_2$ salt reactor was pressurized to about 4 barg and the BPANa$_2$ salt solution was sprayed via spray nozzles into a primary drier (1st drier) containing a pool of hot oDCB at 130° C. to 145° C. The 1st drier was always maintained under N$_2$ purge (about 8 to 10 Kg/hr of N$_2$). As the BPANa$_2$ salt solution was sprayed, free moisture (unbound water) was quickly evaporated and the BPANa$_2$ precipitated as a white solid in oDCB. During the course of solvent swapping, the quantity of oDCB lost with water due to azeotropic boiling was replaced with fresh oDCB from the dry oDCB storage vessel (earlier oDCB was stored either at 175° C. or 145° C.) so as to maintain a constant percentage solid (13%) of the resulting BPANa$_2$ salt slurry.

After the completion of BPANa$_2$ salt spray over, the temperature of the 1st drier was increased to remove the free moisture by stripping of oDCB at its boiling temperature (180° C.). Once the moisture measured in the vapor condensate was decreased to less than 50 ppm, the 1st drier temperature was decreased to 140° C. to 150° C. The BPANa$_2$ salt slurry in oDCB was re-circulated using a pump via a homogenizer (grinder) to reduce the particle size of BPANa$_2$ salt. After 1 hour of homogenization, a pre-homogenized KP slurry in oDCB was pumped into the drier. During the course of homogenization, BPANa$_2$ salt samples were withdrawn and checked for the particle size distribution. The homogenization was continued until the BPANa$_2$ salt particles met the process specification (particle size target less than 100 microns), normally at the end of 2.5 hours. The same sample was analyzed for APHA to track the color of the BPANa$_2$ salt.

C. Secondary Drier

The relatively dry slurry (less than 200 ppm moisture) from the 1$^{st}$ stage drier, at about 15% solids, was transferred to a 2$^{nd}$ stage dryer to remove the residual moisture before its use in polymerization. After the transferring of the BPANa$_2$ salt was complete, the temperature of the 2$^{nd}$ stage dryer was increased to 180° C. to remove any bound or unbound moisture from the BPANa$_2$ salt slurry. Again, at this stage the oDCB lost due to azeotropic boiling with water was compensated by charging hot dry oDCB from the header into the 2$^{nd}$ drier. During the course of drying, samples were drawn and analyzed for moisture by KF titration. Once the BPANa$_2$ salt slurry was dried to less than 20 ppm moisture, the BPANa$_2$ salt slurry was concentrated to a desired level, for example, about 15% by driving off oDCB. After the BPANa$_2$ salt concentration was completed, the temperature of BPANa$_2$ salt slurry was decreased to about 150° C. and stored under nitrogen atmosphere until used in the polymerization step. The concentrated BPANa$_2$ salt slurry sample was withdrawn to measure the BPANa$_2$ salt solid wt. % in oDCB and APHA color. In a further simplification of the process, both drying stages can be conducted in a single drier.

Imidization

Typical ratios of raw materials charged during the course of imidization and then polymerization are provided in Table 2.

TABLE 2

| Raw material | Value | UOM |
|---|---|---|
| mPD/ClPA | 29.6 | % wt |
| PA/ClPA | 0.9 | % wt |
| HEGCl/Polymer | 0.8-1 | % mol |
| BPA Salt/mPD | 2.5 | kg/kg |

Wet oDCB was charged into a reactor, equipped with a mechanical stirrer, a solids addition port, an overhead line with condenser, various addition nozzles, and means to maintain a nitrogen atmosphere. The quantity of oDCB used in each reaction was based on the desired percentage solids of the imidization reaction.

Laboratory Scale Protocol

After charging oDCB, the raw materials (mPD, PA and ClPA as a 95:5 mixture of 4-ClPA and 3-ClPA) were charged into the reactor at room temperature (25° C.). The mixture was kept under continuous nitrogen sweep for an hour to de-oxygenate the system. The temperature of the reaction was then slowly raised to 180° C. in steps within an hour.

Pilot Scale Protocol

After charging oDCB, the temperature of the reactor was increased to about 120° C. During this time oDCB was degassed by bubbling nitrogen through it. When the temperature reached 120° C., ClPA and PA were charged manually through the reactor's hopper. Subsequently the hopper was flushed by oDCB. Next, the temperature of the reactor was increased to about 160° C. over a period of 45 minutes. The reactor was held at this temperature for about 30 minutes to ensure a homogeneous mixture in the reactor. During this time, nitrogen was bubbled through the reactant mixture to remove any dissolved gases.

Another vessel was charged with mPD and oDCB at room temperature. The mixture was bubbled with nitrogen for 2 hours, and then heated to 75° C. to 80° C. to provide a solution of mPD dissolved in oDCB (solid wt. %=25 to 27%). The mPD solution thus prepared was charged slowly into the imidization reactor at about 160° C. over a period of 45 minutes. After the completion of the mPD addition, the temperature of the reactor was increased to about 170° C. to 175° C. and was held at this temperature for the duration of the reaction. During this period, mPD reacted with ClPA to provide oDCB based ClPAMI slurry containing intermediate products of this reaction and water as byproduct. Water vapors leaving the reactor along with oDCB were condensed and collected in the collection pot. At the end of 2 hours, an aliquot sample was drawn to measure the stoichiometry of the reaction. The following species were analyzed for stoichiometry calculations: 4-chlorophthalic acid, 3-chlorophthalic acid, phthalic acid, 4-chlorophthalic anhydride, 3-chlorophthalic anhydride, phthalic anhydride, 4-monoamine, 3-monoamine, and phthalic anhydride monoamine The stoichiometry of ClPAMI was calculated using the analysis data for the above chemical species and the appropriate reactant (either ClPA or mPD, referred as stoichiometry correction) were charged to achieve the desired stoichiometry in the imidization reactor. After 1 hour from the completion of stoichiometry correction, a sample was drawn again for measuring the stoic. The activity of sampling and stoic correction was repeated until the desired reaction specification was achieved. Once the reaction was on specification, the ClPAMI was dried to less than 20 ppm moisture by stripping of oDCB. The on stoic, dried ClPAMI thus prepared marked the completion of imidization reaction. Generally, the ClPAMI/oDCB slurry was about 13 to 17% solids. Once the moisture specification was achieved, ClPAMI was considered ready for polymerization.

The ClPAMI made above was purified by isolating it from the solvent via filtration, and washed the filtered solids was washed with different solvents or solvent mixtures. The solid ClPAMI powder was then dried (at 150° C. under vacuum for 5 to 6 hours) and charged to the polymerization reactor.

Polymerization

Process 1 (Basic Method)

Once the ClPAMI was on stoichiometry then it was dried to achieve less than 20 ppm moisture. Then 1 mole % HEGCl (containing about 500 to 1,000 ppm moisture) was added to ClPAMI and the mixture was dried to less than 20 ppm moisture. Once the dried ClPAMI met all the specs (Stoic: −0.1 to 0.3 mole % ClPA rich, residual 3-MA and 4-MA less than 0.04 mole %), dry BPANa$_2$ salt was added (maintained at 165° C. to 170° C.) over a period of about 30 to 60 minutes to start the polymerization.

Process 2 (Double Slurry Method)

Once the ClPAMI was on stoichiometry, then it was dried to achieve less than 20 ppm moisture. After the dried ClPMAI met all the specs (Stoichiometry: −0.15-0.3 mole % ClPA rich, residual MA (4-MA plus 3-MA; total residual MA in the ClPAMI is abbreviated r-MA) less than 0.4-0.6 mole %), dry BPANa$_2$ salt (maintained at 165° C. to 170° C. for pilot scale) was added over a period of about 20 minutes. Once the BPANa$_2$ salt addition was complete, the oDCB based HEGCl solution (moisture less than 50 ppm) was added to start the polymerization. (In the cold double slurry method, the combined ClPAMI solvent slurry and BPANa2 solvent slurry is cooled to 100 to 150° C. before the catalyst is added.) For laboratory scale, BPANa$_2$ salt dried below 20 ppm moisture and stored at room temperature under N$_2$ environment was used to start the polymerization.

For both process 1 and process 2, the polymerization ran at about 180° C. (boiling point of oDCB). Samples were withdrawn during the course of polymerization to track the molecular weight built by Gel Permeation chromatography (GPC). NaCl was the byproduct of the polymerization reaction and it was removed in downstream operations. Polymerization reactions were typically run at 20 to 25% solids concentration in lab whereas about 25 to 27% solids at pilot scale.

Polymer Isolation and Purification

After the completion of the polymerization reaction the polymer mass was diluted to approximately 10 wt. % with dry oDCB. A desired amount of $H_3PO_4$ (85 wt. % in water) was then added to quench the polymerization reaction at 165° C. to 170° C. This lowered the color of the reaction mass. Once the reaction mass pH was less than 3, the quenching was complete. The total quenching time was about an hour. After quenching, the reaction mass was cooled down to room temperature and passed through vacuum filter assembly to remove the NaCl out of the system. The clear filtrate was then analyzed for solid % and Yellowness Index (YI).

Examples 1-7

These examples show the effect of BPA salt color on polyetherimide color. The experiments were carried out only by varying the $BPANa_2$ salt APHA.

A master batch of ClPAMI (Stoic: about 0.13 mole % ClPA rich, r-MA=0.21 mole %) was used for all the Examples 1-7. ClPAMI was reacted with $BPANa_2$ salt having different APHA values following the same procedure (polymerization procedure 2 described above). The YI values of the produced polyetherimide are reported in Table 3.

TABLE 3

| Example No. | APHA of the $BPANa_2$ salt | YI of PEI |
|---|---|---|
| 1 | 45 | 78 |
| 2 | 45 | 79 |
| 3 | 46 | 74 |
| 4 | 46 | 74 |
| 5 | 69 | 84 |
| 6 | 111 | 99 |
| 7 | 111 | 101 |

The data in Table 3 shows a strong correlation between the color of $BPANa_2$ salt and the color of polyetherimide polymer, i.e., an increase in $BPANa_2$ APHA value results in an increase of YI of the polyetherimide polymer produced.

Examples 8-61

These examples identify the factors that affect APHA of $BPANa_2$ salt and illustrate processes to prepare low colored $BPANa_2$ salt in lab as well in pilot scales.

Examples 8 and 9

Two batches of $BPANa_2$ salt were made at 175° C. following the same general procedure, except that in Example 8, the $BPANa_2$ synthesis and drying was conducted under nitrogen and in Example 9, the reaction was conducted under air. The APHA values of the $BPANa_2$ salt at different reaction times were measured and reported in Table 4.

TABLE 4

| APHA of $BPANa_2$ salt | | |
|---|---|---|
| Reaction Time (hr.) | Example 8 (under $N_2$) | Example 9 (under air) |
| 0 | 44 | 44 |
| 7 | 57 | 385 |
| 24 | 69 | 559 |

The data in Table 4 indicate that the presence of oxygen during the synthesis of $BPANa_2$ salt degrades the salt quality and increases the APHA value of the salt.

Examples 10-17

Commercial nitrogen may contain small amounts of oxygen. To determine the permissible oxygen level in nitrogen, $BPANa_2$ salts were synthesized under nitrogen containing 2 ppm, 60 ppm, and 100 ppm oxygen following the general lab procedure described above except that for Examples 10-13, the $BPANa_2$ salts were made without using potassium phosphate (KP) either in the solvent swapping stage or the drying stage, whereas for Examples 14-17, 1.25 wt. % potassium phosphate with respect to polyetherimide was added as an aqueous solution (nitrogen was bubbled through this solution for about 30 minutes) during solvent swapping stage. The reaction conditions and the results are shown in Table 5.

TABLE 5

| | Ex. 10 | Ex. 11 | Ex. 12 | Ex. 13 | Ex. 14 | Ex. 15 | Ex. 16 | Ex. 17 |
|---|---|---|---|---|---|---|---|---|
| $O_2$ level in $N_2$ (ppm) | 2 | 60 | 100 | 100 | 100 | 2 | 2 | 2 |
| KP/No-KP | No-KP | No-KP | No-KP | No-KP | KP | KP | KP | KP |
| Stoich. of mg BPA/liter of toluene | 103 | 105 | 105 | 97 | 105 | 97 | 98 | 105 |
| APHA of $BPANa_2$ (after drying) | <10 | <10 | <10 | 10 | 21 | 20 | 22 | 20 |

The data in Table 5 indicate that the 100 ppm oxygen level in nitrogen does not cause any harm to $BPANa_2$ salt quality (the lab made $BPANa_2$ salt consistently shows APHA less than 10 even after drying stage).

The data also show that when KP is used in the process, the APHA values increase almost 10 units after the drying operation. On the other hand, when KP is not used in the process, the APHA values do not increase after the drying step. This indicates that KP is bringing some color to the $BPANa_2$ salt irrespective of $O_2$ level in nitrogen. Based on the study, the APHA buildup was minimized at pilot scale by delaying the KP addition, i.e., KP (pre-homogenized KP slurry in oDCB) was added during the drying operation rather than at the solvent swapping stage.

Examples 18-20

Lab polymerizations were run with the same master batch of ClPAMI using low APHA BPANa$_2$ salt made as described above following the polymerization process 2. The results are provided in Table 6. The data indicate that when BPANa$_2$ salts having low APHA values are used, the produced polyetherimide polymers have low YI.

TABLE 6

|  | Ex. 18 | Ex. 19 | Ex. 20 |
|---|---|---|---|
| APHA of BPANa$_2$ | 15 | 15 | 12 |
| PEI YI | 75 | 65 | 58 |

Examples 21-26

These examples establish the kinetics of thermal degradation of BPA salt. The information helps to store BPANa$_2$ salt below the specified temperature to avoid significant thermal degradation of BPANa$_2$ salt.

For this study a BPANa$_2$ salt was used with solid concentration of 24.6 wt. %. Approximately 350 ml of BPANa$_2$ slurry was added to a one-liter bottle. For Example 21, the remaining portion of this bottle was filled with compressed air instead of N$_2$ to determine the effect of air on BPANa$_2$ salt quality at room temperature. Examples 22-26 were carried out at different temperatures under N$_2$ atmosphere (continuous N$_2$ sweep) and mild stirring using magnet stirrer in 1 liter round bottom flask equipped with a condenser and a Dean-Stark apparatus.

The experimental construct was a central composite design with temperature (70, 100, 130, 150, and 175° C.) and time (2, 5, 10, 15, 20, 24 hours) as two variables. The samples were withdrawn for APHA analysis, at the times as recorded. The results are shown in Table 7.

TABLE 7

| Example No. | Condition | Time (hr.) | BPA salt APHA |
|---|---|---|---|
| 21 | At 25° C. under air | 0.0 | 76 |
|  |  | 22.0 | 76 |
|  |  | 49.3 | 81 |
|  |  | 70.5 | 80 |
|  |  | 166.5 | 83 |
|  |  | 195.0 | 86 |
|  |  | 214.5 | 86 |
|  |  | 222.5 | 88 |
|  |  | 244.0 | 87 |
| 22 | At 70° C. under continuous N$_2$ sweep | 0.0 | 76 |
|  |  | 10.0 | 70 |
| 23 | At 100° C. under continuous N$_2$ sweep | 0.0 | 76 |
|  |  | 4.5 | 81 |
|  |  | 17.0 | 87 |
| 24 | At 130° C. under continuous N$_2$ sweep | 0.0 | 76 |
|  |  | 2.0 | 91 |
|  |  | 10.0 | 93 |
|  |  | 24.5 | 109 |
| 25 | At 150° C. under continuous N$_2$ sweep | 0.0 | 76 |
|  |  | 4.5 | 91 |
|  |  | 17.0 | 107 |
| 26 | At 175° C. under continuous N$_2$ sweep | 0.0 | 76 |
|  |  | 2.0 | 95 |
|  |  | 10.0 | 104 |
|  |  | 24.5 | 110 |

The data in Table 7 show that the APHA value of BPANa$_2$ salt increases with time at higher temperature even under N$_2$ atmosphere. This indicates that BPANa$_2$ salt is prone to thermal degradation. Room temperature storage of BPANa$_2$ salt does not affect the APHA remarkably. Based on the analysis of variance the correlation of BPANa$_2$ salt APHA with time and temperature is as follows.

$$BPA\text{-}Na_2 \text{ salt APHA} = 65.825 + 0.06*Time + 0.16*Temp + 4.72 \times 10^{-3}*Time*Temp$$

Examples 27-51

BPANa$_2$ salts were synthesized at pilot scale. In all these batches, pre-homogenized KP slurry was added during the homogenization step to avoid BPANa$_2$ salt APHA color buildup due to aqueous KP spray-over. The oxygen level in the nitrogen supply was also analyzed, and it was found to be less than 5 ppm. The process changes with respect to the general procedure are shown in the last column of Table 8. All these changes were either related to oxygen ingress (instead of adding NaOH pellets, add de-oxygenated caustic lye solution), reaction temperature (controlling the exothermicity by slow addition of caustic lye) or thermal degradation (carrying out solvent swapping at low temperature). The APHA values of 1$^{st}$ drier BPA salts and final BPA salts are shown in Table 8.

TABLE 8

| Example No. | 1$^{st}$ Drier BPANa$_2$ salt APHA | Final BPANa$_2$ salt APHA | Remarks/Process changes |
|---|---|---|---|
| 27 | 41 | 54 | 1. The solvent swapping temperature |
| 28 | 25 | 28 | was higher: 140-145° C. |
| 29 | 30 | 34 |  |
| 30 | — | 45 |  |
| 31 | 25 | 28 |  |
| 32 | — | 45 |  |
| 33 | 28 | 30 | 1. The solvent swapping temperature |
| 34 | — | 65 | was reduced to: 130-135° C. |
| 35 | 30 | 30 | 2. Pre-homogenized KP with N$_2$ |
| 36 | 40 | 40 | bubbling was added. |
| 37 | 30 | 33 | 3. NaOH pellets were added via |
| 38 | ~10 | 15 | hopper at reaction temperature. |
| 39 | 18 | 18 | 1. The solvent swapping temperature |
| 40 | 13 | 20 | was reduced to 130-135° C. |
| 41 | 17 | 25 | 2. Pre-homogenized KP with N$_2$ |
| 42 | 20 | 21 | bubbling was added. |
| 43 | 28 | 18 | 3. Caustic lye was added via sparge |
| 44 | 20 | 19 | and dip-tube at reaction temperature. |
| 45 | 20 | 21 |  |
| 46 | 20 | 25 |  |
| 47 | 15 | 15 |  |
| 48 | 18 | 21 |  |
| 49 | 15 | 16 |  |
| 50 | 11 | 11 |  |
| 51 | 8 | 8 |  |

Examples 52-61

BPA salts having different APHA values were used for polymerization reactions following either polymerization process 1 or polymerization process 2. The YI of prepared PEI polymer are reported in Table 9.

TABLE 9

| Example No. | BPANa2 Salt APHA | Polymerization | YI of PEI polymer |
|---|---|---|---|
| 52 | 90 | Process 1 | 108 |
| 53 | 96 | Process 1 | 107 |
| 54 | 61 | Process 1 | 102 |

TABLE 9-continued

| Example No. | BPANa2 Salt APHA | Polymerization | YI of PEI polymer |
|---|---|---|---|
| 55 | 28 | Process 1 | 96 |
| 56 | 31 | Process 2 | 76 |
| 57 | 15 | Process 2 | 70 |
| 58 | 40 | Process 2 | 73 |
| 59 | 21 | Process 2 | 64 |
| 60 | 11 | Process 1 | 70 |
| 61 | 8 | Process 1 | 72 |

As shown in Table 9, Examples 52-55, 60, and 61 followed the polymerization process 1 using BPA salt having APHA ranging from 8 to 96. The data indicate that polyetherimide prepared from $BPANa_2$ salt having a low APHA value had less color as compared to polyetherimide prepared from $BPANa_2$ salt having a high APHA value. In the case of polymerization process 2, the BPA salt used was of low APHA color thus resulted in PEI having YI of less than 76 (Examples 56-59).

Examples 62-76

These examples illustrate the effect of ClPAMI purity on the color of the polyetherimide polymer. The same lot of ClPAMI was used to draw samples which were then used "as is" or purified according to procedure A or procedure B as follows:

ClPAMI Purification Procedure A

A sample of approximately 600 g of ClPAMI slurry in oDCB was taken for purification. Methanol or hexane was added to the reactor containing the slurry. The mixture was mixed well for about 30 minutes and then drained from the reactor. The slurry was then filtered by vacuum filtration using Whatman 42 paper. The filter cake was thoroughly washed either with methanol or hexane and dried in an oven under nitrogen.

ClPAMI Purification Procedure B

ClPAMI slurry made as described in [0021] to [0024] was thoroughly washed with hot (at 130° C.) as well as cold oDCB following the same procedure as described in [0048] above.

The unpurified and purified ClPAMI were then used in polymerization. The polymerization procedures varied the use of sodium phenylphosphinate (SPP, an imidization catalyst) and tripotassium phosphate (KP), and are described as SPP-KP recipe, SPP-No KP recipe or no SPP-KP recipe. The SPP catalyst (0.099 wt. % with respect to CLPA), when present, was added during the process of imidization along with the other regular reactants. Tripotassium phosphate (KP, 2.8 to 3.0 wt. % with respect to BPA Salt), when present, was added during the drying process of BPA salt preparation. In SPP-KP recipe, both KP and SPP were used as described above whereas in SPP-No KP recipe, KP was not used but SPP was used. The YI values of prepared PEI polymer were reported in Tables 10, 11, and 12 respectively. HPLC chromatography of purified ClPAMI (as in Procedure B) is shown in FIG. 1 and the HPLC chromatography of the unpurified ClPAMI also shown in FIG. 1.

Table 10. Effect of ClPAMI purification on the YI of PEI (ClPAMI stoic=about 0.07% with SPP and KP based $BPANa_2$ salt)

TABLE 10

| Example No. | ClPAMI Purification | APHA of BPA-Na₂ salt | PEI MW (Kg/kmol) | PEI YI |
|---|---|---|---|---|
| 62 | Not purified | 60 | 52724 | 120 |
| 63 | Not purified | 60 | 41300 | 120 |
| 64 | Purified (MeOH/Hexane) | 60 | 46240 | 97 |
| 65 | Purified (MeOH/Hexane) | 60 | 43950 | 95 |
| 66 | Purified (cold oDCB) | 60 | 57700 | 85 |
| 67 | Purified (hot oDCB) | 45 | 55562 | 69 |

TABLE 11

Effect of ClPAMI purification on the YI of PEI with SPP and no KP salt

| Example No. | ClPAMI Purification | PEI MW (kg/kmol) | PEI YI |
|---|---|---|---|
| 68 | Not purified | 49554 | 85 |
| 69 | Not purified | 51800 | 79 |
| 70 | Not purified | 47400 | 87 |
| Average YI | | | 84 |
| 71 | Purified (MeOH and Hexane) | 52100 | 74 |
| 72 | Purified (MeOH and Hexane) | 57700 | 76 |
| 73 | Purified with oDCB (cold) | 49166 | 74 |
| Average YI | | | 75 |

TABLE 12

The effect of washing ClPAMI with oDCB/hexane/methanol solvent (Procedure A) on color (KP was used during polymerization), SPP not used.

| Example No. | ClPAMI Purification | PEI MW. (Kg/kmol) | PEI YI |
|---|---|---|---|
| 74 | Not purified | 41380 | 107 |
| 75 | Not purified | 35000 | 123 |
| 76 | Purified | 43362 | 70 |

Example 77-99

These examples show the effect of mPD color on the color of polyetherimide.

Example 77

The color development of mPD as related to the APHA value is shown in FIG. 2. As can be seen from FIG. 2, the molten mPD color progressively becomes brown as its APHA rises to 200 APHA. As APHA color rises further, the molten mPD darkens and eventually appears black.

Examples 78-93

The correlation between mPD APHA color and polyetherimide polymer color was studied. A good quality $BPANa_2$ salt (APHA about 30) was used in all these experiments to avoid the variations coming from BPA salt quality. The mPD APHA was varied from less than 10 to 330. Three different polymerization processes were employed, process 2 for examples 78 to 84, process 1 for examples 85 to 90, and cold double slurry recipe for examples 91-93. The HEGCl was added to the on stoic ClPAMI (Stoic: ~0.1 to 0.2 mole % ClPA rich, r-MA less than 0.04 mole %) and the reaction mass temperature was reduced from 175° C. to a lower range of 130° C. to 135° C. after drying. Then dried BPA salt (either hot, 90° C. to 100° C., or cold, 25° C.) was added into it. The reaction mass was kept at 130° C. to 135° C. for an hour and then heated back to 180° C. (boiling point of oDCB) to start polymerization) for Examples 91 to 93. The results are shown in Tables 13 to 15. All these YI numbers are measured at the end of filtration step.

The data show a strong correlation between the mPD APHA color and polymer YI.

TABLE 13

| Example No. | APHA of mPD | PEI MW (Kg/kmol) | PEI YI |
|---|---|---|---|
| 78 | 12 | 44915 | 75 |
| 79 | 12 | 46425 | 79 |
| 80 | 75 | 51379 | 78 |
| 81 | 75 | 55300 | 79 |
| 82 | 100 | 50350 | 83 |
| 83 | 158 | 41060 | 84 |
| 84 | 170 | 40300 | 90 |

TABLE 14

| Example No. | APHA of mPD | PEI MW (Kg/kmol) | PEI YI |
|---|---|---|---|
| 85 | 7 | 46500 | 76 |
| 86 | 17 | 37400 | 89 |
| 87 | 130 | 47470 | 87 |
| 88 | 130 | 48320 | 89 |
| 89 | 160 | 41380 | 107 |
| 90 | 170 | 40723 | 102 |

TABLE 15

| Example No. | APHA of mPD | PEI MW (Kg/kmol) | PEI YI |
|---|---|---|---|
| 91 | 17 | 42600 | 80 |
| 92 | 136 | 41000 | 78 |
| 93 | 330 | 44631 | 108 |

Examples 94-96

Three different reactions were performed in order to determine the effect of ClPA quality on final polymer YI (measured as quenched YI). Heat aged ClPA samples having different APHA values were prepared. These ClPA samples were used in the imidizations and polymerizations processed under similar conditions. The results are shown in Table 16. The polymer YI increases about 15 units when ClPA having an APHA value of 316 is used as compared to when ClPA having an APHA value of 20 or 115 is used.

TABLE 16

| Example No. | ClPA APHA | BPANa$_2$ salt APHA | % KP | PEI Mw at plateau, Da | Time to plateau, hours | PEI YI after quenching |
|---|---|---|---|---|---|---|
| 94 | 316 | 31 | 1 | 42506 | 15 | 106 |
| 95 | 115 | 31 | 1 | 78044 | 11 | 91 |
| 96 | 20 | 31 | 1 | 51034 | 12 | 92 |

This disclosure is further illustrated by the following embodiments, which are exemplary.

Embodiment 1

A method for the manufacture of a polyetherimide, the method comprising contacting a halophthalic anhydride having an APHA index of less than 120 and of formula (7) with an organic diamine having an APHA index of less than 170 and of the formula H$_2$N—R—NH$_2$ to form a bis (halophthalimide) of formula (9); and contacting the bis (halophthalimide) with an alkali metal salt of a dihydroxy aromatic compound having an APHA index of less than 100, in the presence or absence of an additional base selected from alkali metal carbonates, alkyl hydrides, alkali metal hydroxides, alkali metal phosphates, alkali metal bicarbonates, alkali metal acetates, and combinations thereof, wherein the metal salt of the dihydroxy aromatic compound is of the formula MO—Z—OM to form the polyetherimide comprising the structural units of formula (1) as described above; and n is an integer greater than 1, wherein the polyetherimide has a Yellowness Index of less than 90.

Embodiment 2

The method of Embodiment 1, further comprising (a) contacting an aqueous solution of an alkali base with a dihydroxy aromatic compound to form an aqueous solution of an alkali metal salt of the dihydroxy aromatic compound; (b) contacting the aqueous solution of the alkali metal salt of the dihydroxy aromatic compound with ortho-dichlorobenzene at a temperature sufficient to remove water producing an ortho-dichlorobenzene slurry of the alkali metal salt of the dihydroxy aromatic compound; and (c) homogenizing the ortho-chlorobenzene slurry of the alkali metal salt of the dihydroxy aromatic compound to provide the alkali metal salt of the dihydroxy aromatic compound having an APHA index of less than 100.

Embodiment 3

The method of Embodiment 1 or 2, wherein the alkali metal salt of the dihydroxy aromatic compound has an APHA index of less than 50.

Embodiment 4

The method of Embodiment 1 or 2, wherein the aqueous solution of the alkali base is degassed to remove dissolved oxygen.

Embodiment 5

The method of Embodiment 2, further comprising heating an aqueous solution of a disodium salt of a dihydroxy aromatic compound to a temperature of 70° C. to 95° C.; and adding the aqueous solution of the alkali base to the heated ortho-dichlorobenzene in such a way that the temperature of the combination of the added aqueous solution of the alkali base and the heated ortho-dichlorobenzene solution of the dihydroxy aromatic compound is less than 130 to 180° C.

Embodiment 6

The method of any one of Embodiments 2 to 5, wherein at step (b) the aqueous solution of the alkali metal salt of the dihydroxy aromatic compound is contacted with ortho-dichlorobenzene at a temperature of 130° C. to 135° C.

Embodiment 7

The method of any one of Embodiments 2 to 5, further comprising drying the homogenized ortho-dichlorobenzene slurry of the alkali salt of the dihydroxy aromatic compound to less than 20 ppm of moisture in the slurry as measured in the overheads.

Embodiment 8

The method of any of Embodiments 2 to 7, wherein the additional base is tripotassium phosphate.

Embodiment 9

The method of Embodiment 8, wherein the tripotassium phosphate is added in the form of solid or an aqueous solution.

Embodiment 10

The method of Embodiment 7, wherein a pre-homogenized tripotassium phosphate ortho-dichlorobenzene slurry is added to the homogenized ortho-dichlorobenzene alkali salt of the dihydroxy aromatic slurry at the drying step.

Embodiment 11

The method of Embodiment 10, wherein the pre-homogenized tripotassium phosphate ortho-dichlorobenzene slurry is degassed to remove dissolved oxygen.

Embodiment 12

The method of any of Embodiments 2 to 7, wherein the tripotassium phosphate is dried with the BPANa2 in ortho-dichlorobenzene.

Embodiment 13

The method of Embodiment 8, further comprising contacting the crude bis(halophthalimide) with a solvent selected from petroleum ethers, aromatic hydrocarbons, halogenated aromatics, halogenated aliphatics, aliphatic ethers, alcohols, acetonitrile, aliphatic ketones, aliphatic esters, halogenated aromatics, halogenated hydrocarbons or a combination thereof to provide a slurry; filtering the slurry to provide a filtered bis(halophthalimide); and washing the filtered bis(halophthalimide) with methanol, hexane, ortho-dichlorobenzene, or a combination comprising at least one of the foregoing to provide the bis(halophthalimide) useful to produce a polyetherimide having a Yellowness Index of less than 93.

Embodiment 14

The method of Embodiment 9, wherein the method comprises heating a solvent selected from petroleum ethers, aromatic hydrocarbons, halogenated aromatics, halogenated aliphatics, aliphatic ethers, alcohols, acetonitrile, aliphatic ketones, aliphatic esters, halogenated aromatics, halogenated hydrocarbons, or a combination comprising at least one of the foregoing to an elevated temperature of 30 to 180° C.; washing the filtered bis(halophthalimide) with the heated solvent to provide the bis(halophthalimide) useful to produce a polyetherimide having a Yellowness Index of less than 93.

Embodiment 15

The method of any of Embodiments 1 to 15, wherein the polyetherimide having a Yellowness Index of less than 70.

Embodiment 16

The method of Embodiment 1, wherein the halophthalic anhydride has an APHA index of less than 120, and the organic diamine has an APHA index of less than 100.

Embodiment 17

A method for the manufacture of a polyetherimide, the method comprising contacting a halophthalic anhydride having an APHA index of less than 20 and of the formula (7) with an organic diamine having an APHA index of less than 100 and of the formula $H_2N—R—NH_2$ to form a crude bis(halophthalimide) of formula (9); contacting the crude bis(halophthalimide) with methanol, hexane, or a combination thereof to provide a slurry; filtering the slurry to provide a filtered bis(halophthalimide); and washing the filtered bis(halophthalimide) with methanol, hexane, ortho-dichlorobenzene, or a combination comprising at least one of the foregoing at a temperature of at least 100° C., to provide bis(halophthalimide) useful to produce a polyetherimide having a Yellowness Index of less than 93, and then contacting the bis(halophthalimide) with an alkali metal salt of a dihydroxy aromatic compound having an APHA index of less than 50, wherein the metal salt of the dihydroxy aromatic compound is of the formula MO—Z—OM to form the polyetherimide comprising the structural units of formula (1) as described above; and n is an integer greater than 1, wherein the polyetherimide has a Yellowness Index of less than 93.

Embodiment 18

A low color polyetherimide prepared via the halo-displacement reaction from an alkali metal salt of a dihydroxy aromatic compound having an APHA index of less than 120, and an organic diamine with an APHA of less than 100, wherein the polyetherimide has the formula

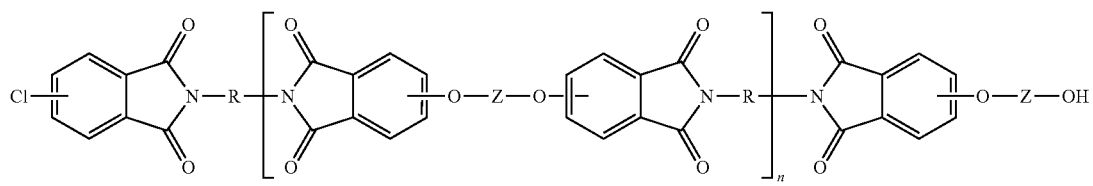

wherein R and Z are a linear or cyclic $C_{2-20}$ alkyl group or a substituted or unsubstituted $C_{6-30}$ aryl group, n has a value of 1 to 40, wherein the polyetherimide has: a YI of less than 93; a chlorine content greater than 0 ppm; and a hydroxyl group end content of 1 to 1000.

Embodiment 19

The low color polyetherimide of Embodiment 18, wherein the polyetherimide has a Yellowness Index of less than 90.

Embodiment 20

The low color polyetherimide of Embodiment 18, wherein the polyetherimide has a Yellowness Index of less than 70.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges directed to the same component or property are inclusive of the endpoint and independently combinable. All molecular weights refer to weight average molecular weights unless indicated otherwise. All molecular weights are expressed in Daltons. Combination" is inclusive of blends, mixtures, alloys, reaction products, and the like "Or" means "and/or." The terms "a" and "an" and "the" herein do not denote a limitation of quantity, and are to be construed to cover both the singular and the plural. Reference throughout the specification to "another embodiment", "an embodiments" and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Compounds are described using standard nomenclature. Any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. When the substituent is oxo (i.e., =O), then two hydrogens on the atom are replaced. Combinations of substituents and/or variables are permissible provided that the substitutions do not significantly adversely affect synthesis or use of the compound. The term "substituted" means that at least one hydrogen on the designated atom or group is replaced with another group, provided that the designated atom's normal valence is not exceeded. Groups that can be present on a "substituted" position are cyano, hydroxyl, halogen, nitro, alkanoyl (such as a $C_{2-6}$ alkanoyl group such as acyl), carboxamido, $C_{1-8}$ or $C_{1-3}$ alkyl, $C_{3-8}$ cycloalkyl, $C_{2-8}$ alkenyl, $C_{2-38}$ alkynyl, $C_{1-6}$ or $C_{1-3}$ alkoxy, $C_{6-10}$ aryloxy such as phenoxy, $C_{1-6}$ alkylthio, $C_{1-6}$ or $C_{1-3}$ alkylsulfinyl, $C_{1-6}$ or $C_{1-3}$ alkylsulfonyl, $C_{6-12}$ aryl, $C_{7-19}$ arylalkylene having 1 to 3 separate or fused rings and 6 to 12 ring carbon atoms; or arylalkoxy having 1 to 3 separate or fused rings and 6 to 18 ring carbon atoms, with benzyloxy being an exemplary arylalkoxy.

All ASTM tests are based on the 2003 edition of the Annual Book of ASTM Standards unless otherwise indicated.

All cited patents, patent applications, and other references are incorporated herein by reference in their entirety.

While the invention has been described with reference to a specific embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for the manufacture of a polyetherimide, the method comprising:

contacting a halophthalic anhydride having an APHA index of less than 120 and of the formula

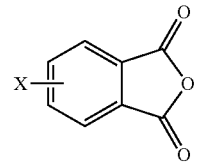

with an organic diamine having an APHA index of less than 170 and having the formula

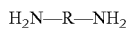

to form a bis(halophthalimide) of the formula

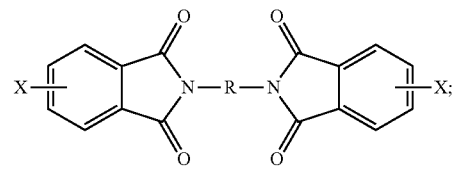

and contacting the bis(halophthalimide) with an alkali metal salt of a dihydroxy aromatic compound having an APHA index of less than 100, wherein the metal salt of the dihydroxy aromatic compound is of the formula

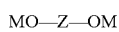

to form the polyetherimide comprising structural units of the formula

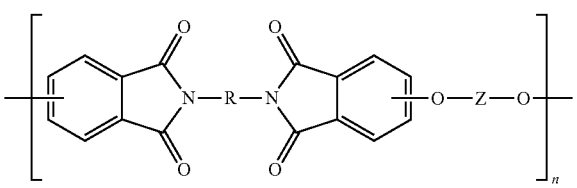

wherein in the foregoing formulae

X is fluoro, chloro, bromo, iodo, or a combination thereof;
each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof;

M is an alkali metal;

Z is an aromatic $C_{6-24}$ monocyclic or polycyclic moiety optionally substituted with 1 to 6 $C_{1-8}$ alkyl groups, 1 to 8 halogen atoms, and combinations thereof; and n is an integer greater than 1;

wherein the polyetherimide has a Yellowness Index of less than 93.

2. The method of claim 1, further comprising
contacting an aqueous solution of an alkali metal base with a dihydroxy aromatic compound to form an aqueous solution of an alkali metal salt of the dihydroxy aromatic compound;
contacting the aqueous solution of the alkali metal salt of the dihydroxy aromatic compound with ortho-dichlorobenzene at a temperature sufficient to remove water, to produce an ortho-dichlorobenzene slurry of the alkali metal salt of the dihydroxy aromatic compound; and
homogenizing the ortho-chlorobenzene slurry of the alkali metal salt of the dihydroxy aromatic compound to provide the alkali metal salt of the dihydroxy aromatic compound having an APHA index of less than 100.

3. The method of claim 1, wherein the aqueous solution of the alkali base is degassed to remove dissolved oxygen.

4. The method of claim 2, further comprising:
heating an aqueous solution of a disodium salt of a dihydroxy aromatic compound to a temperature of 70° C. to 95° C.; and
adding the aqueous solution of the alkali metal base to the heated ortho-dichlorobenzene such that the temperature of the combination of the added aqueous solution of the alkali metal base and the heated ortho-dichlorobenzene solution of the dihydroxy aromatic compound is 130 to 180° C.

5. The method of claim 2, wherein the aqueous solution of the alkali metal salt of the dihydroxy aromatic compound is contacted with ortho-dichlorobenzene at a temperature of 130 to 135° C.

6. The method of claim 2, further comprising drying the homogenized ortho-dichlorobenzene slurry of the alkali salt of the dihydroxy aromatic compound to less than 20 ppm of moisture in the slurry as measured in the overheads.

7. The method of claim 1, wherein contacting the bis (halophthalimide) with the alkali metal salt of a dihydroxy aromatic compound is in the presence of an additional base selected from alkali metal carbonates, alkyl hydrides, alkali metal hydroxides, alkali metal phosphates, alkali metal bicarbonates, alkali metal acetates, and combinations thereof.

8. The method of claim 7, wherein the additional base is tripotassium phosphate.

9. The method of claim 7, wherein a pre-homogenized ortho-dichlorobenzene slurry of the additional base is added to the homogenized ortho-dichlorobenzene alkali salt of the dihydroxy aromatic slurry at the drying step.

10. The method of claim 9, wherein the pre-homogenized ortho-dichlorobenzene slurry is degassed to remove dissolved oxygen.

11. The method of claim 7, wherein the additional base, is dried with the alkali metal salt in ortho-dichlorobenzene.

12. The method of claim 1, further comprising contacting the crude bis(halophthalimide) with a solvent selected from petroleum ethers, aromatic hydrocarbons, halogenated aromatics, halogenated aliphatics, aliphatic ethers, alcohols, acetonitrile, aliphatic ketones, aliphatic esters, halogenated aromatics, halogenated hydrocarbons or a combination thereof, to provide a slurry;
filtering the slurry to provide a filtered bis(halophthalimide); and
washing the filtered bis(halophthalimide) with methanol, hexane, ortho-dichlorobenzene, or a combination comprising at least one of the foregoing to provide the bis(halophthalimide) useful to produce a polyetherimide having a Yellowness Index of less than 93.

13. The method of claim 12, comprising heating the solvent contacting the selected from petroleum ethers, aromatic hydrocarbons, halogenated aromatics, halogenated aliphatics, aliphatic ethers, alcohols, acetonitrile, aliphatic ketones, aliphatic esters, halogenated aromatics, halogenated hydrocarbons, or a combination comprising at least one of the foregoing to an elevated temperature of 30 to 180° C.;
washing the filtered bis(halophthalimide) with the heated solvent to provide the bis(halophthalimide).

* * * * *